(12) United States Patent
Lim

(10) Patent No.: US 7,029,046 B2
(45) Date of Patent: Apr. 18, 2006

(54) LEVEL-ADJUSTING APPARATUS FOR AN ATTACHMENT DEVICE

(75) Inventor: Jeong Chan Lim, Ulsan (KR)

(73) Assignee: Hyundai Motor Company, Seoul (KR)

( * ) Notice: Subject to any disclaimer, the term of this patent is extended or adjusted under 35 U.S.C. 154(b) by 264 days.

(21) Appl. No.: 10/628,723

(22) Filed: Jul. 28, 2003

(65) Prior Publication Data

US 2004/0130085 A1    Jul. 8, 2004

(30) Foreign Application Priority Data

Dec. 18, 2002   (KR) ...................... 10-2002-0081423

(51) Int. Cl.
*B25J 15/06* (2006.01)
(52) U.S. Cl. ........................................ 294/65; 294/64.1
(58) Field of Classification Search ............... 294/64.1, 294/65, 81.6, 81.62, 87.1; 901/40; 414/627, 414/737, 752.1
See application file for complete search history.

(56) References Cited

U.S. PATENT DOCUMENTS

| | | | | | |
|---|---|---|---|---|---|
| 2,941,675 | A | * | 6/1960 | Noble et al. | 414/627 |
| 3,970,201 | A | * | 7/1976 | Keene | 414/591 |
| 4,129,328 | A | * | 12/1978 | Littell | 294/65 |
| 4,266,905 | A | * | 5/1981 | Birk et al. | 414/627 |
| 4,561,687 | A | * | 12/1985 | Bostrom | 294/64.1 |
| 4,651,396 | A | * | 3/1987 | Kerlidou | 29/213.1 |
| 4,743,159 | A | * | 5/1988 | Inamori | 414/737 |
| 5,839,769 | A | * | 11/1998 | Slocum et al. | 294/87.1 |

* cited by examiner

*Primary Examiner*—Dean J. Kramer
(74) *Attorney, Agent, or Firm*—Morgan Lewis & Bockius LLP

(57) ABSTRACT

An level-adjusting apparatus for an attachment according to this invention comprises a fixed frame attached to a sub frame that is movable horizontally; a cylinder assembly, which is mounted on one side of the fixed frame, having a suction cup on its lower end; a flexible screw shaft disposed in the cylinder assembly so as to be connected with the suction cup; and an actuator that drives the flexible screw shaft to move vertically so that the cylinder assembly contracts and elongates. Accordingly, the vertical position of the suction cup can be adjusted in accordance with the shape of a work piece.

6 Claims, 4 Drawing Sheets

US 7,029,046 B2

LEVEL-ADJUSTING APPARATUS FOR AN ATTACHMENT DEVICE

FIELD OF THE INVENTION

This invention relates to a level-adjusting apparatus for an attachment device, and more particularly, to an apparatus that adjusts the space from a work panel to a suction cup so that the connection between them is accomplished securely regardless of a shape of the work panel.

BACKGROUND OF THE INVENTION

Generally, a factory automation system for a press is provided with an attachment device that is attached to machines so as to grip and transfer a work panel betweens processes.

A conventional attachment device typically comprises a suction cup gripping a work panel; a sub frame for adjusting the horizontal position of the suction cup; and a vertical shaft assembly interposed between the suction cup and the sub frame.

The vertical shaft assembly typically comprises a connecting element attached to the sub frame supporting a vertical shaft that is spring biased and to which the suction cup is attached.

Generally, the connecting element of the attachment is fixed to the sub frame by welding, and the vertical shaft is fixed between first and second supporting elements so that the horizontal and vertical position of the suction cup cannot be adjusted. Accordingly, the attachment device must be specially designed in accordance with the shape of each different work panel.

SUMMARY OF THE INVENTION

An embodiment of the present invention comprises a level-adjusting apparatus for an attachment device, comprising a support member attached to a sub frame that is movable horizontally; a cylinder assembly mounted on one side of the fixed frame having a suction cup on its lower end; a flexible screw shaft passing through the cylinder assembly so as to be connected to the suction cup; and an actuator driving the flexible screw so as to adjust the vertical position of the suction cup that is connected to the flexible screw shaft.

The support member is preferably provided with a guiding pipe thereon so that the flexible screw shaft is guided.

The end of the guiding pipe is preferably configured to curve to an angle of 90 degrees with respect to the suction cup end of the screw shaft so as to prevent it from interfering with the sub frame.

The cylinder assembly comprises a plurality of nesting cylinders that are each provided with an upper stopper protruding outward of the cylinder and a lower stopper protruding inward of the cylinder. Accordingly, a cylinder with a smaller diameter fits snugly into a cylinder with a larger diameter so that the cylinders can move within a limited range.

Preferably, the actuator can be a motor.

Preferably, a power transfer element, which is interposed between the motor and the screw shaft, comprises a driving gear connected to the output shaft of the motor, and a driven gear outwardly meshed with the driving gear and inwardly meshed with the flexible screw shaft.

DETAILED DESCRIPTION OF THE PREFERRED EMBODIMENTS

Preferred embodiments of the present invention will hereinafter be described in detail with reference to the accompanying drawings.

Figure 1:
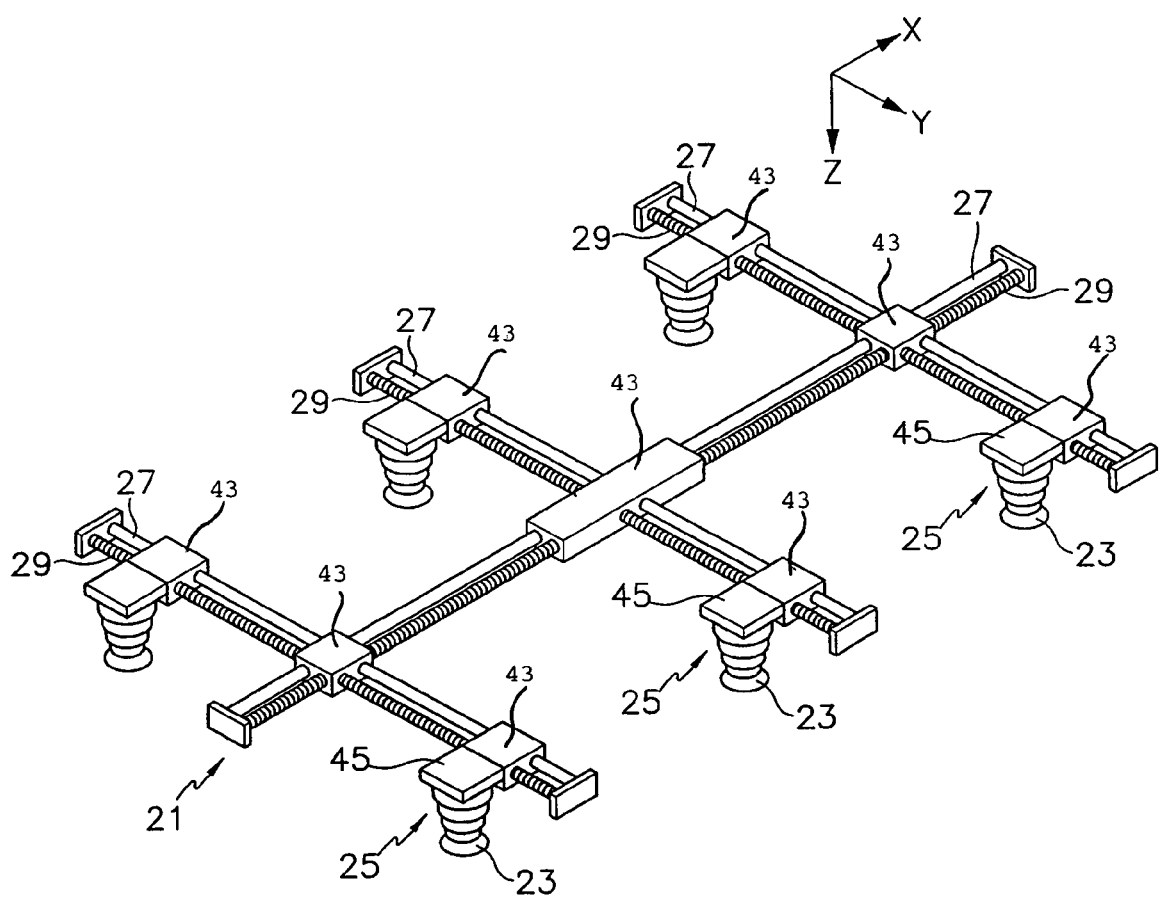
FIG. 1 is a perspective view of an attachment according to an embodiment of this invention.

As shown in FIG. 1, an attachment device according to an embodiment of the present invention for transporting a work panel (not shown) comprises a sub frame 21; a suction cup 23 gripping the work panel; and a level-adjusting apparatus 25 interposed between the sub frame 21 and the suction cup 23 for adjusting the vertical position of the suction cup 23.

The sub frame 21 is configured to adjust the horizontal position of the suction cup 23 on an X-Y plane. The sub frame 21 comprises a plurality of driving parts 43; a plurality of guide shafts 27; and a plurality of screw shafts 29 driven by the driving part 43.

Figure 2A:
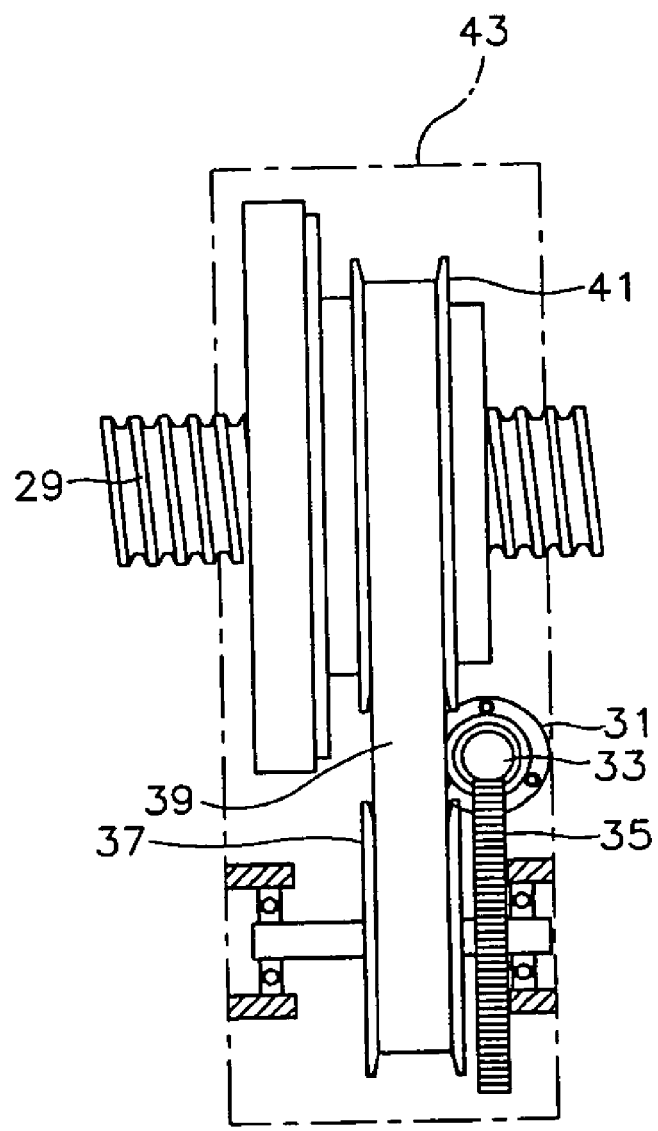
FIG. 2A is a fragmentary plan view of a sub frame.
Figure 2B:
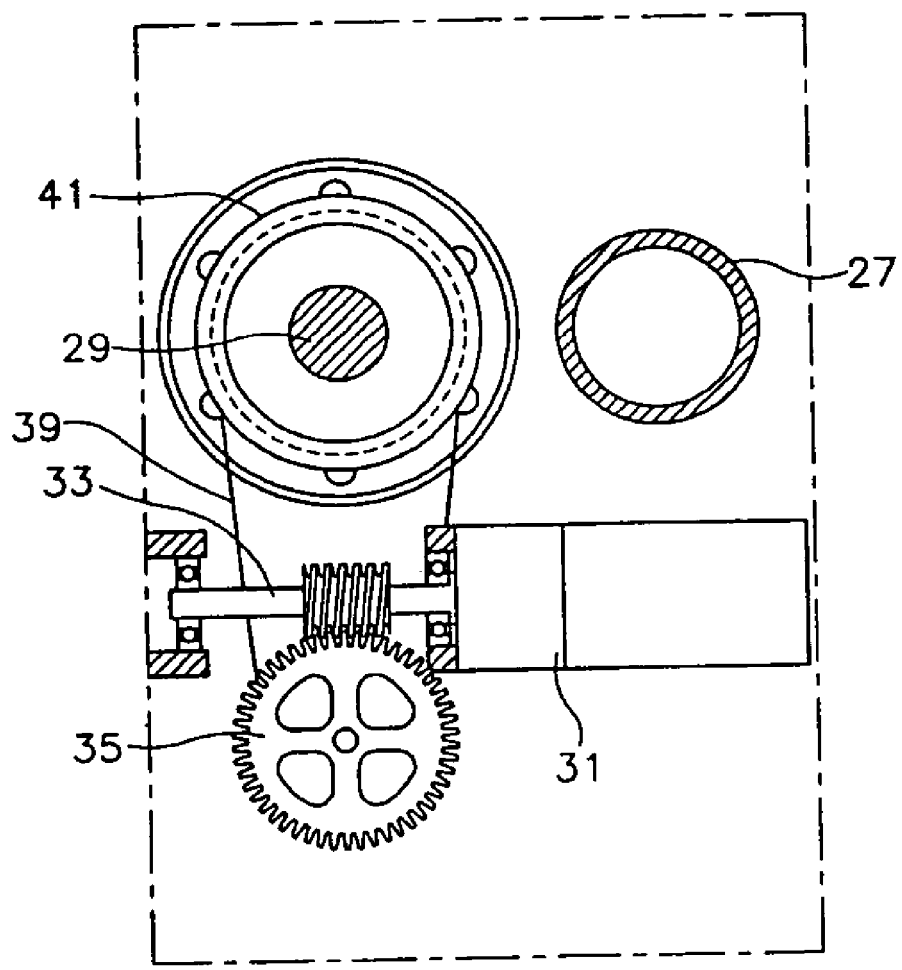
FIG. 2B is a fragmentary side view of FIG. 2A.

As shown in FIG. 2A and FIG. 2B, a motor 31 provided in each driving part 43 drives a worm gear 33, 35 by which a driving pulley 37 is driven. Accordingly, a driven pulley 41 is driven by the driving pulley 37 with a belt 39.

As the driven pulley 41 rotates the screw shaft 29, the driving part 43 moves along the guide shaft 27. Accordingly, the level-adjusting apparatus 25 connected to the driving part 43 and the suction cup 23 connected to the level-adjusting apparatus 25 can move on the X-Y plane.

Furthermore, the level-adjusting apparatus 25 adjusts the vertical position of the suction cup 23 fixed thereon in the Z axis direction so that the suction cup 23 can grip the work panel with accuracy.

Figure 3:
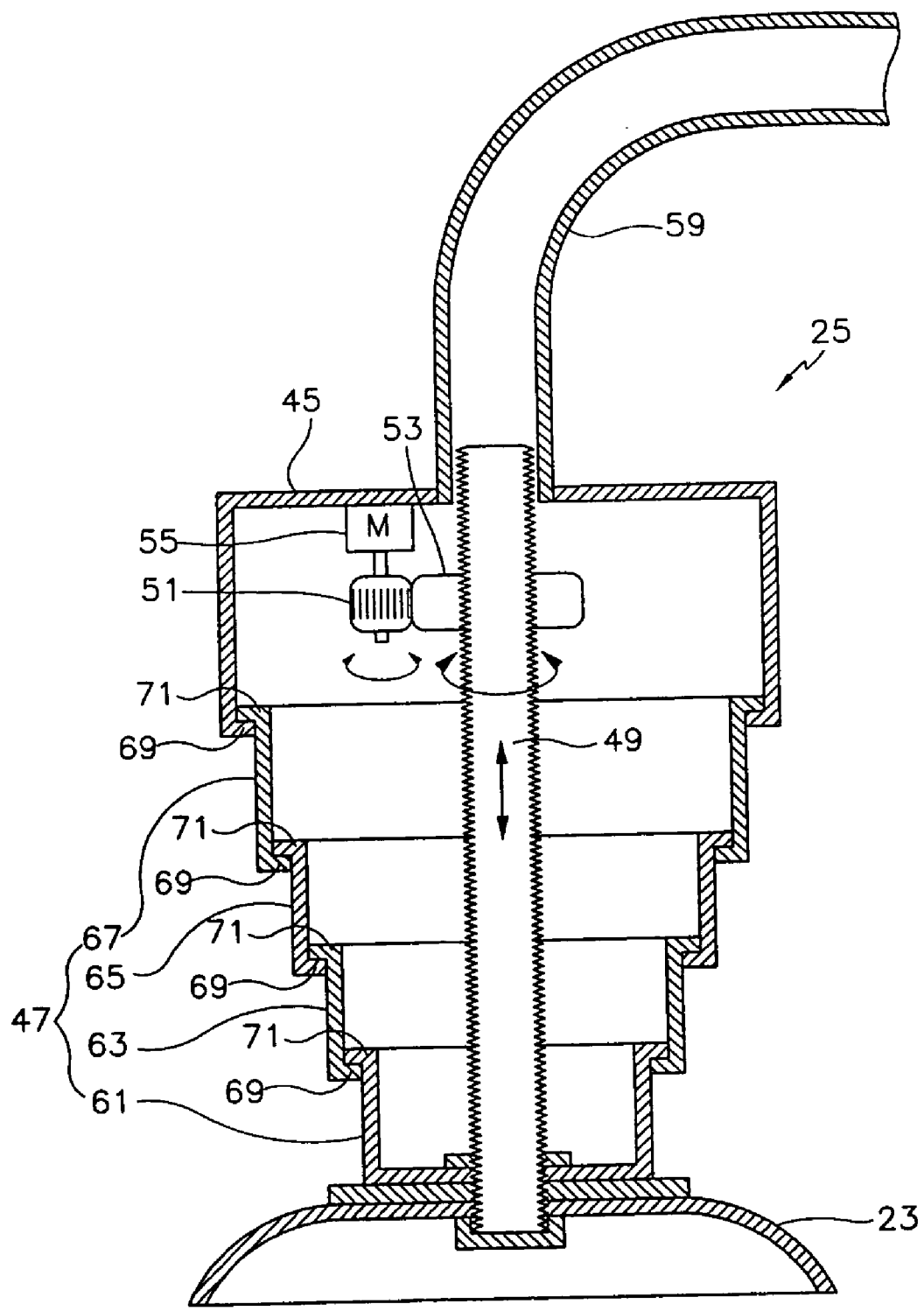
FIG. 3 is a vertical sectional view of a level-adjusting apparatus of the attachment in FIG. 1.

As shown in FIG. 3, the level-adjusting apparatus 25 for an attachment comprises a support member 45; a cylinder assembly 47; a flexible screw shaft 49; a driving gear 51; a driven gear 53; and an actuator 55. The support member 45 is attached to the driving part 43 of the sub frame 21. The cylinder assembly 47, which is configured to be extendable and contractible, is mounted on the lower part of the support member 45. The suction cup 23 connected to the flexible shaft 49 is mounted on the lower part of the cylinder assembly 47.

The cylinder assembly 47 comprises a plurality of nesting cylinders 61, 63, 65, and 67 that are each provided with an upper stopper protruding outward of the cylinders 61, 63, 65, and 67 and a lower stopper protruding inward of the cylinder 61, 63, 65, and 67. Accordingly, a cylinder with a smaller diameter is inserted into a cylinder with a larger diameter so that the cylinders 61, 63, 65, and 67 can move within limited ranges.

The flexible screw shaft 49 passes through the center of the cylinder assembly 47 so that the lower end of the flexible screw shaft is connected to the suction cup 23, and the upper end of the flexible screw shaft is provided with the driven gear 53 driven by the driving gear 51 connected to the actuator 55.

The flexible screw shaft 49 is moved vertically by driving gear 51 and driven gear 53, which are driven by driving power generated from the actuator 55, so that the cylinder assembly 47 can elongate or contract. Accordingly, the vertical position of the suction cup 23 in the Z axis direction can be adjusted by movement of the flexible screw shaft 49.

Furthermore, the flexible screw shaft 49 has predetermined rigidity so as to support the load of the cylinder assembly 47 and work piece (not shown), and it also has predetermined elasticity so as to absorb an impact transferred from the suction cup 23.

Furthermore, the support member 45 is provided with a guide pipe 59, which guides the protruding part of the flexible screw shaft 49 from the support member 45 to prevent interference of the flexible screw shaft 49 with its surroundings.

In order to prevent the interference, the guide pipe 59 is preferably configured to be curved to an angle of 90 degrees with respect to the suction cup end of the flexible screw shaft 49.

Furthermore, the cylinder assembly 47 is preferably formed of an aluminum alloy so as to reduce the load applied to the flexible screw shaft 49.

Furthermore, the actuator 55 is preferably a motor, and the driving gear 51 is connected to an output shaft of the motor, which drives the driven gear 53.

The driven gear 53 is meshed with the driving gear 51, and the flexible screw shaft 49 passes through the center of the driven gear 53. Accordingly, as the driven gear 53 is fixed with direction to Z-axis and rotates about the screw shaft 49, the screw shaft 49 moves up or down in accordance with the revolutionary direction of the driven gear 53.

As described above, the level-adjusting apparatus for an attachment according to this invention can adjust the vertical position of the suction cup in a manner such that the cylinder assembly can elongate or contract. Accordingly, the attachment having the level-adjusting apparatus can be used regardless of the shape of the work piece.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

Throughout this specification and the claims which follow, unless explicitly described to the contrary, the word "comprise" or variations such as "comprises" or "comprising" will be understood to imply the inclusion of stated elements but not the exclusion of any other elements.

What is claimed is:

1. A level-adjusting apparatus for an attachment device, comprising
   a support member attached to a sub frame that is movable horizontally;
   a cylinder assembly mounted on one side of the support member having a suction cup on its lower end;
   a flexible screw shaft passing through the cylinder assembly so as to be connected to the suction cup; and
   an actuator driving the flexible screw shaft so as to adjust the vertical position of the suction cup connected to the flexible screw shaft,
   wherein the support member is provided with a guiding pipe thereon so that the flexible screw shaft is guided.

2. The apparatus of claim 1, wherein the end of the guiding pipe is configured to be curved to 90 degrees with respect to the suction cup end of the screw shaft so as to prevent it from interfering with the sub frame.

3. A level-adjusting apparatus for an attachment device, comprising
   a support member attached to a sub frame that is movable horizontally;
   a cylinder assembly mounted on one side of the support member having a suction cup on its lower end;
   a flexible screw shaft passing through the cylinder assembly so as to be connected to the suction cup; and
   an actuator driving the flexible screw shaft so as to adjust the vertical position of the suction cup connected to the flexible screw shaft,
   wherein the cylinder assembly comprises a plurality of nesting cylinders that are provided with upper stoppers protruding outward of the cylinders and lower stoppers protruding inward of the cylinders, and a cylinder with a smaller diameter snugly fits into a cylinder with a larger diameter.

4. An apparatus of claim 3, wherein the actuator is a motor.

5. An apparatus of claim 4, further comprising:
   a power transfer element interposed between the motor and the screw shaft,
   wherein the power transfer element comprises a driving gear connected to the output shaft of the motor; and a driven gear outwardly meshed with the driving gear and inwardly meshed with the flexible screw shaft.

6. A level-adjusting apparatus for an attachment device, comprising
   a support member attached to a sub frame that is movable horizontally;
   a cylinder assembly mounted on one side of the support member having a suction cup on its lower end;
   a flexible screw shaft passing through the cylinder assembly so as to be connected to the suction cup;
   a motor driving the flexible screw so as to adjust the vertical position of the suction cup connected to the flexible screw shaft; and
   a power transfer element interposed between the motor and the screw shaft,
   wherein the power transfer element comprises a driving gear connected to the output shaft of the motor, and a driven gear outwardly meshed with the driving gear and inwardly meshed with the flexible screw shaft.

* * * * *